United States Patent
Voigt et al.

(10) Patent No.: US 9,547,942 B2
(45) Date of Patent: Jan. 17, 2017

(54) AUTOMATED DETECTION OF AREA AT RISK USING QUANTITATIVE T1 MAPPING

(71) Applicant: KONINKLIJKE PHILIPS N.V., Eindhoven (NL)

(72) Inventors: Tobias Ratko Voigt, Aachen (DE); Andrea Jane Wiethoff, Dallas, TX (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 212 days.

(21) Appl. No.: 14/374,731

(22) PCT Filed: Jan. 22, 2013

(86) PCT No.: PCT/IB2013/050543
§ 371 (c)(1),
(2) Date: Jul. 25, 2014

(87) PCT Pub. No.: WO2013/111051
PCT Pub. Date: Aug. 1, 2013

(65) Prior Publication Data
US 2015/0213652 A1 Jul. 30, 2015

Related U.S. Application Data

(60) Provisional application No. 61/591,412, filed on Jan. 27, 2012.

(51) Int. Cl.
*G06K 9/00* (2006.01)
*G06T 19/20* (2011.01)
(Continued)

(52) U.S. Cl.
CPC .............. *G06T 19/20* (2013.01); *G06K 9/6226* (2013.01); *G06T 7/0012* (2013.01);
(Continued)

(58) Field of Classification Search
CPC .................. G06T 2207/30048; G06T 7/0081; G06T 7/0097; G06T 2207/10096; G06T 2207/20076
See application file for complete search history.

(56) References Cited

U.S. PATENT DOCUMENTS 6,205,349 B1 3/2001 Kim
6,842,638 B1 * 1/2005 Suri ....................... A61B 6/481
382/128

(Continued)

OTHER PUBLICATIONS

Detsky, J.S. et al "Reproducible Classification of Infarct Heterogeneity using Fuzzy Clustering on Multicontrast Delayed Enhancement Magnetic Resonance Images", IEEE Transactions on Medical Imaging, vol. 28, No. 10, Oct. 2009, pp. 1606-1614.

(Continued)

*Primary Examiner* — Bhavesh Mehta
*Assistant Examiner* — Ian Lemieux

(57) ABSTRACT

A medical imaging system (5) includes a data store (12), a clustering module (22), and a display device (32). The data store (12) includes a first imaging data set and a second imaging data set, each data set created with the same imaging device (10) and the same measured value. The measured value of a first and a second tissue type overlap in the first imaging data set. The measured value of the second and a third tissue type overlap in the second data set. The data sets are co-registered, and an external event changes the measured value of the second data set. The clustering module (22) classifies the tissue type based on a fuzzy clustering of the measured value of the first data set and the measured value of the second data set for each location. The display device (32) displays a medical image which contrasts each classified tissue type.

14 Claims, 4 Drawing Sheets

Figure 1:
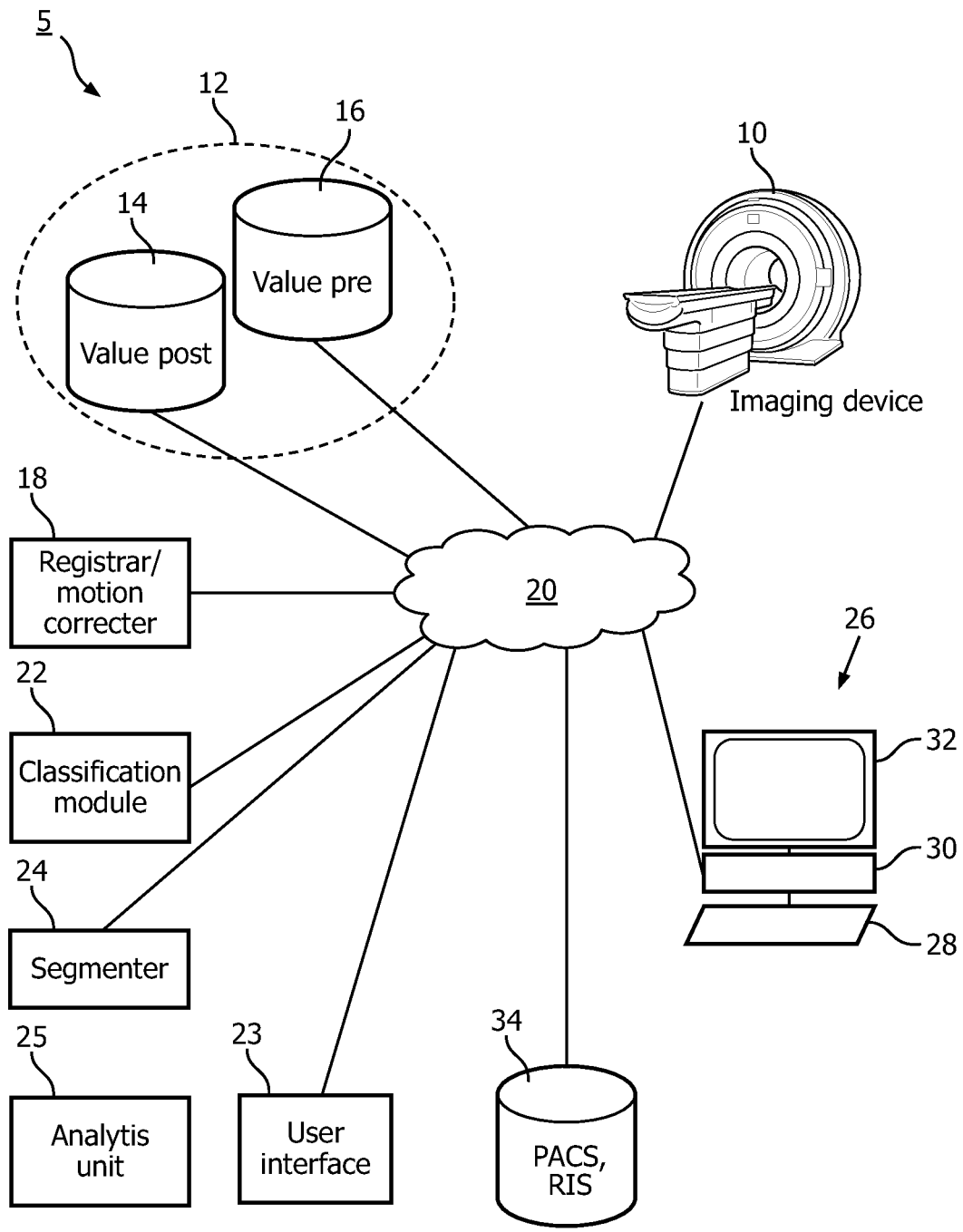

(51) Int. Cl.
 *G06T 7/00* (2006.01)
 *G06K 9/62* (2006.01)
(52) U.S. Cl.
 CPC .......... *G06T 7/0028* (2013.01); *G06T 7/0081* (2013.01); *G06T 7/0097* (2013.01); *G06T 2207/10024* (2013.01); *G06T 2207/10072* (2013.01); *G06T 2207/10096* (2013.01); *G06T 2207/20076* (2013.01); *G06T 2207/30048* (2013.01); *G06T 2207/30101* (2013.01); *G06T 2210/41* (2013.01); *G06T 2219/2012* (2013.01)

(56) References Cited

U.S. PATENT DOCUMENTS

| 8,086,297 | B2 | 12/2011 | Rehwald | |
|---|---|---|---|---|
| 2004/0218794 | A1* | 11/2004 | Kao | G06T 7/0012 382/128 |
| 2008/0119721 | A1 | 5/2008 | Kimura | |
| 2009/0080749 | A1 | 3/2009 | Visser | |
| 2009/0275822 | A1* | 11/2009 | Detsky | A61B 5/055 600/413 |

OTHER PUBLICATIONS

Chen, Zhong et al "Infarct Myocardium Tissue Heterogeneity Assessment using Pre-contrast and Post-Contrast T1 Maps Acquired with Modified Look-Locker Inversion Recovery (MOLLI) Imaging", Journal of Cardiovascular Magnetic Resonance, vol. 14, No. Suppl 1, Feb. 2012, pp. P263.

Messroghli, Daneil R. et al "Modified Look-Locker Inversion Recovery (MOLLI) for High Resolution T2 Mapping of the Heart", Magnetic Resonance in Medicine, vol. 52, 2004, pp. 141-146.

Buerger, Christian, et al "Hierarchical Adaptive Local Affine Registration for Fast and Robust Respiratory Motion Estimation", Medical Image Analysis, vol. 15, 2001, pp. 551-564.

Simor, Tamas et al "Percent Infarct Mapping for Delayed Contrast Enhancement Magnetic Resonance Imaging to Quantify Myocardial Viability by Gd(DTPA)", Journal of Magnetic Resonance Imaging, vol. 32, 2010, pp. 859-868.

Roes, Stijnje D. et al "Infarct Tissue Heterogeneity Assessed with Contrast-Enhanced MRI Predicts Spontaneous Ventricular Arrhythmia in Patients with Ischemic Cardiomyopathy and Implantable Cardioverter-Defibrillator", Circulation Cardiovascular Imaging. 2009 2;183-190.

Yan, Andrew T. et al "Characterization of the Peri-Infarct Zone by Contrast-Enhanced Cardiac Magnetic Resonance Imaging is a Powerful Predictor of Post-Myocardial Infarction Mortality", Circulation, Journal of the America Heart Association, 2006, 114:32-39.

Schmidt, Andre et al "Infarct Tissue Heterogeneity by Magnetic Resonance Imaging Identifies Enhanced Cardiac Arrhythmia Susceptibility in Patients with Left Ventricular Dysfunction", Circulation, Journal of the America Heart Association, 2007, 115;2006-2014.

* cited by examiner

AUTOMATED DETECTION OF AREA AT RISK USING QUANTITATIVE T1 MAPPING

CROSS-REFERENCE TO PRIOR APPLICATIONS

This application is the U.S. National Phase application under 35 U.S.C. §371 of International Application No. PCT/IB2013/050543, filed on Jan. 22, 2013, which claims the benefit of U.S. Provisional Patent Application No. 61/591,412, filed on Jan. 27, 2012. These applications are hereby incorporated by reference herein.

The present application relates generally to medical imaging. It finds particular application in conjunction with identifying specific body tissues, and will be described with particular reference thereto. However, it will be understood that it also finds application in other usage scenarios and is not necessarily limited to the aforementioned application.

Grey zone quantification is important in several clinical applications. Recent medical literature reports that the size of unhealthly tissue types such as infarct and grey zone are predictors of myocardial infarction (MI). For example, "[i]n patients with a prior MI, the extent of the peri-infarct zone characterized by C[ardiac] M[agnetic] R[esonance] provides incremental prognostic value beyond left ventriclar systolic volume index or ejection fraction. Infarct characteristics by CMR may prove to be unique and valuable noninvasise predictor of post-MI mortality." [Circulation 2006; 114:32-29]. Grey zone includes peri-infarct and hetergeneous infarct. Also, "Tissue heterogeneity is present and quantifiable within human infarcts. More extensive tissue heterogeneity correlates with increased ventricular irritability by programmed electrical stimulation. These findings support the hypothesis that anatomic tissue heterogeneity increases suspectibility to ventricular arrhythmias in patients with prior myocardial infarction and L[eft] V[entricular] dysfunction." [Circulation 2007; 115:2006-2014]. Lastly, "[i]nfarct tissue heterogeneity on contrast-enhanced MRI is the strongest predictor of spontaneous ventricular arrhythmia with subsequent I[mplantable] C[ardioverter] D[efibrillator] therapy (as surrogate of sudden cardiac death) among other clinical and MRI variables, that is, total infarct size and left ventricular function and volumes, in patients with previous myocardial infarction." [Circulation 2009. 2:183-190].

Previous efforts focused on contrast enhancing the unhealthy tissue in an image and segmenting the area by manual delineation to measure the volume or by semi-automatic segmentation based on signal intensity of single images. The contrast enhancing lacks accuracy because multiple tissue types are involved and there is overlap in the contrast of types of healthy tissue and unhealthy tissue such as infarct and grey zone. Multiple contrast settings are necessary which makes the task of segmenting or identifying the unhealthy tissue tedious to manually outline a specific tissue type for measurement.

Additionally, the multiple images include multiple modalities, machines, coil calibrations, settings, and the like. Using different techniques between one image and another to contrast enhance the areas introduces error from differences such as coil calibrations, specific settings, and the like. For example, one method uses quantification based on signal intensity images and T1 maps. The images in this method are influenced by coil sensitivities and do not exhibit complementary contrast to the T1 map.

Typically magnetic resonance techniques assess the area using conventional MR late enhancement scanning sequence such as an inversion recovery gradient echo (IR-GE). The sequence is susceptible to cardiac motion and requires a precise inversion time (TI) in order to separately identify scars or infarct, grey zone and heathly myocardium. The precise identification of the various tissue types is time consuming. The optimal TI varies from patient to patient and also varies with the elapsed time between the injection of a contrast agent and image acquisition. The optimal inversion time occurs when the signals from healthy myocardium are null and appear black, and infarct areas are bright (appear white) with the grey zone in between. The endocardium and blood are manually delineated which can be unclear where a scar occurs at the endocardia-blood border. Image analysis for segmentation based on signal intensity classifies the grey zone between the scar and healthy myocardium. Signal intensity from the blood pool is very close to infarct tissue due to the distribution of the contrast agent. Noise in the myocardium can have a significant impact on segmentation and can be confused with the grey zone.

The present application discloses a new and improved automated detection of areas of risk which addresses the above referenced matters, and others.

In accordance with one aspect, a medical imaging system includes a data store, a clustering module, and a display device. The data store includes a first imaging data set and a second imaging data set, each data set created with the same imaging device and the same measured value. The measured value of a first and a second tissue type overlap in the first imaging data set. The measured value of the second and a third tissue type overlap in the second data set. The data sets are co-registered, and an external event changes the measured value of the second data set. The clustering module classifies the tissue type based on a fuzzy clustering of the measured value of the first data set and the measured value of the second data set for each location. The display device displays a medical image which contrasts each classified tissue type.

In accordance with another aspect, a method of medical imaging includes acquiring a first medical image and after an external event, acquiring a second medical image which includes the same measured value from the same medical imaging device as the first medical image. The external event changes the measured value. The images are co-registered. The tissue type is classified at each location with fuzzy clustering based on the measured value of the first medical image and the measured value of the second medical image. A diagnostic medical image is displayed with a contrast indicative of the classified tissue types.

In accordance with another aspect, a medical imaging system includes a data store, a clustering module, and a segmenter. The data store includes a first imaging data set and a second imaging data set, each data set created with the same device and the same measured value. The data sets are co-registered, and an external event changes the measured value of the second data set. The clustering module classifies the tissue type based on a fuzzy clustering of the measured value of the first data set and the measured value of the second data set for each location. The segmenter calculates a volume measurement for each classified tissue at risk.

One advantage includes the identification and measurement of grey zone tissue.

Another advantage includes independence from coil sensitivities.

Another advantage resides in the reduced dependency on the precise timing of contrast administration.

Another advantage resides in automated classification of tissue types.

Another advantage includes the ease and speed with which tissue types are classified and volumes calculated.

Still further advantages of the present application will be appreciated to those of ordinary skill in the art upon reading and understanding the following detailed description.

The invention may take form in various components and arrangements of components, and in various steps and arrangement of steps. The drawings are only for purposes of illustrating the preferred embodiments and are not to be construed as limiting the invention.

FIG. 1 schematically illustrates an embodiment of the medical imaging system.

Figure 2:
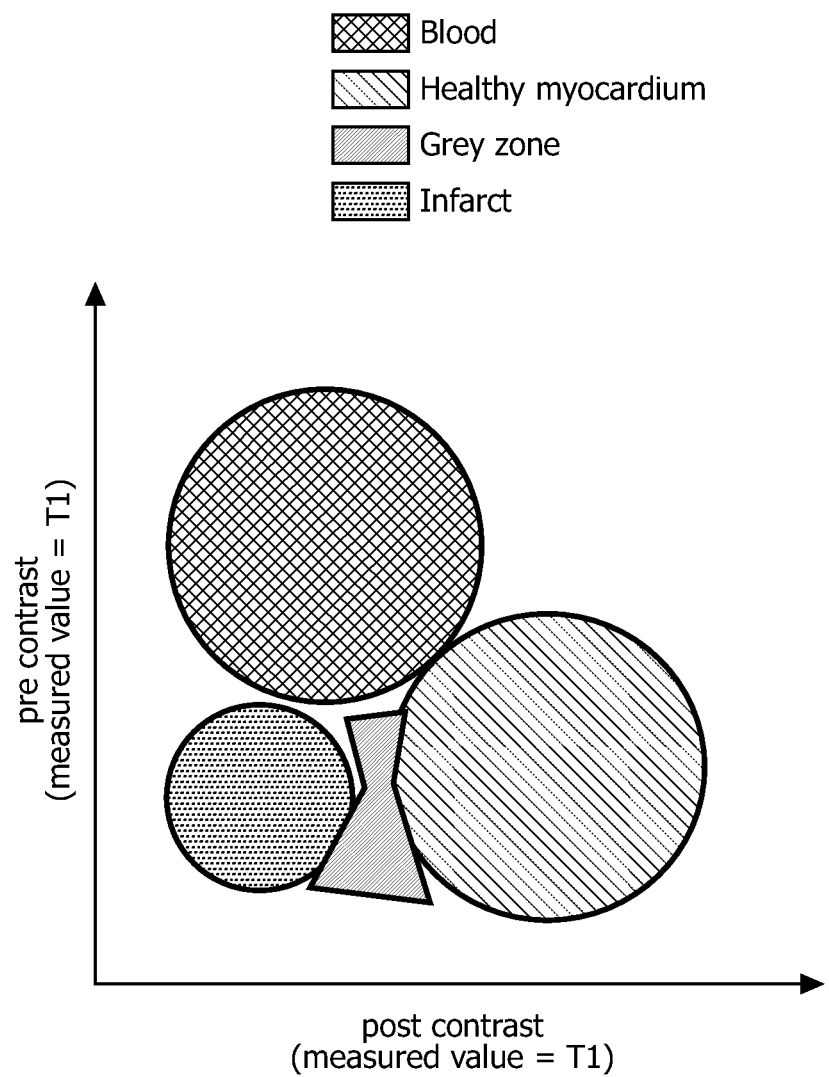

FIG. 2 graphically illustrates an example of the expected tissue clustering in a cardiac analysis magnetic resonance plot with a T1 measured value.

FIGS. 3A-D show an example result of the system with a left ventricular cardiac analysis of one subject.

Figure 4:
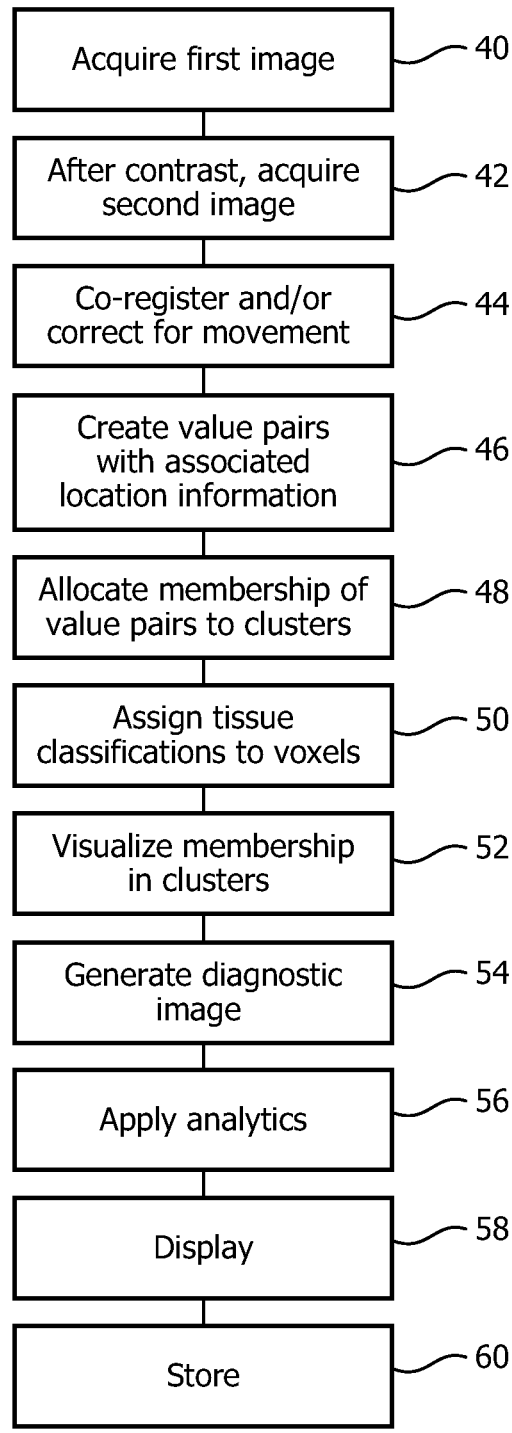

FIG. 4 flowcharts one method of using an embodiment of the medical imaging system.

With reference to FIG. 1, an embodiment of the medical imaging system is schematically illustrated. A medical imaging device 10 such as magnetic resonance (MR), x-ray computed tomography (CT), positron emission tomography (PET), single photon emission tomography (SPECT), a combination or hybrid, and the like create medical imaging data sets stored in a data store 12. The data store can be local memory in a server, storage on a local disk, storage on a network attached storage device, and the like. The data store or memory device 12 includes a first imaging data 14 acquired with a technique that generates images with a first contrast and a second imaging data 16 acquired with a technique that generates a second contrast. The difference in contrast, in one embodiment, is based on administration of a contrast agent. An example of the measured values in MR includes T1 weighted images, T2 weighted images, and the like. The measured values can include direct measurements such as the measured T1 value or indirect measurement such as the T1 value normalized to a grey scale and the like. The measured images have different relative contrasts for each of at least three different tissue types such as blood, healthy myocardium, infarct, and grey zone. More than two imaging data sets are also contemplated in other embodiments where additional imaging data sets includes various time intervals after the administration of the contrast agent.

A registrar 18 co-registers the first and second imaging data if not already or inherently co-registered. The registrar 18 corrects the first and second imaging data for any motion. The registrar connects to the data store 12 and/or the medical imaging device via a network 20. The network can be wired or wireless, internal or external, private or public such as the Internet, or any combination.

A classification module 22 generates measured value pairs from the first and second imaging data of corresponding voxels. The measured value pairs generated include a pair of measured contrast values of corresponding voxels, pixels, or other areas (hereinafter generically "voxels") of the first and second images. For example, if in a T1 weighted image, a voxel is hyper-intense in the first or second image, then the measured value pair is included. If the voxel is not contrasted in either image, then it can be omitted. The measured value pairs can be represented as a scatter grid, an array, or a list of values which include the two measured values at the corresponding voxel location. The classification module clusters the measured value pairs into clusters or groups, and classifies each cluster as a tissue type. The classification module 22 connects to the registrar 18 and/or data store 12 via the network 20. The classification module 22 can share one or more processors with the registrar 18 or be separate. In other embodiments, an n-tuple of measured values from n imaging data sets is contemplated, where n is a plural value. The n corresponding measured values to be clustered can be selected from each n-tuple which provide separation of contrasts. The n imaging data sets can be taken over an interval of time which does not require an exact calibration.

In one embodiment, a user interface 23 can visualize the clustered measured value pairs with diagrams such as a scatter diagram or a contour plot. Each axis represents the measured values of one image. Each measured value pair is plotted as a point in which the point is represented as a classified tissue type. For example, in a scatter diagram, each point is plotted and assigned a symbol and/or color indicative of the cluster membership by a clustering algorithm. The cluster is labeled in the legend as the classified tissue type. In the example of a contour plot, the height of the contour represents a frequency of occurrence.

A segmenter 24, such as a processor which implements a segmentation algorithm, segments or clusters the classified tissue types based on the corresponding voxels of the measured value pairs with the cluster algorithm. For example, if a measured value pair is classified as infarct based on the cluster memberships, then the corresponding voxel of the measured value pair is classified as infarct. A corresponding volume, or the first or second image, can be used to assign the tissue type classification to the voxels.

An analytics unit 25 applies analytics such as volumetric measurements to the segmented tissue types or classified regions. For example, the volume of the grey zone and the volume of the infarct are calculated based on the regions classified as grey zone and infarct, respectively. The segmenter 24 and the analytics unit 25 connect to the network 20 and can share one or more processors with the registrar 18 and/or classification module 22 or be separate.

A workstation 26 includes one or more input devices 28, one or more processors 30, and a display device 32. The workstation 28 includes desktop computers, laptop computers, tablet computers, smartphones, and the like. The one or more input devices 28 input commands from the healthcare practitioner, select images, and the like. The display device 32 displays images, menus, forms, panels, diagrams, plots and the like. The display device includes display of data such as analytics calculated by the segmenter. The display device displays a diagnostic image which includes different colors or contrasts for each classified tissue type. The diagnostic image can be stored in a storage management system 34 such as a PACS, RIS, and the like.

FIG. 2 graphically illustrates an example of the expected tissue clustering in a magnetic resonance plot of cardiac analysis with a measured T1 value. The measured T1 value before the administration of a contrast agent, such as a late gallium enhancement agent are higher for blood, but overlap for infarct, grey zone, and healthy myocardium. The measured T1 value after administration of the contrast agent are higher for heathly myocardium, but overlap for blood, infarct and grey zone. Healthy tissues include blood and healthy myocardium. Tissue types at risk include the grey zone and the infarct. The plot plots the measured T1 values of the voxel pairs on the Y-axis from the pre-contrast image or map, and the measured T1 values on the X-axis from the post-contrast image for each location as a coordinate pair for corresponding voxels.

The two images or maps map gray scale or contrast values corresponding common voxels. In an example, T1 does not need to be calibrated because the same sequence is used for both images such as standard-inversion recovery gradient echo. Because the measured value is measured with the same calibration, the same patient, the same parameters, the same algorithm, etc., the clustering module does not need to account for machine differences, sequence difference, patient differences, etc. Many sources of potential error are eliminated.

The clustering classifies the tissue types by grouping the grey scale or contrast value pairs of the corresponding voxel with and without the contrast agent or other contrast modifications. The measured values in one image overlap for one healthy tissue type and tissue type at risk, and the measured values in the other image overlap for a different healthly tissue type and the tissue type at risk. For example, in the pre-contrast T1, healthy tissue includes healthy myocardium, but not blood, overlaps with areas of risk which include infarct and grey zone. In the post-contrast T1, healthy tissue includes blood, but not healthy myocardium overlaps the areas of risk. Each contrast agent provides an optimum separation of values at a point in time, but the time varies by the subject and also potentially within a subject due to environmental and other factors. The optimal time provides the best difference, but does not need to be precisely measured, because it is not the quantification of the contrast agent that is measured, but the classification of a location influenced by the contrast agent administered. Multiple imaging data sets can be taken to choose an optimal temporal point of contrast for a patient rather than relying on a pre-defined point of measurement.

The segmenting module 24 in one embodiment uses a fuzzy c-means algorithm such as Gustafson-Kessel (FCGK) modification. The FCGK minimizes the function:

$$J_{GK}(U, V) = \sum_{i=1}^{K} \sum_{k=1}^{n} u_{ik}^m \cdot d_i^2(x_k, v_i) \text{ where } v_i = \frac{\sum_{k=1}^{n} u_{ik}^m \cdot x_k}{\sum_{k=1}^{n} u_{ik}^m},$$

$$u_{ik} = \begin{cases} 1 & \text{if } x_k = v_i \\ 0 & \text{if } x_k = v_j \text{ for some } v_j \neq v_i \\ 1 / \sum_{j=1}^{K} \left( \frac{d_i(x_k, v_i)}{d_j(x_k, v_j)} \right)^{\frac{2}{m-1}} & \text{otherwise} \end{cases},$$

$$d_i(x_k, v_i) = \sqrt{(x_k - v_i)^T A_i (x_k - v_i)}, \quad A_i = \sqrt[b]{det(S_i)} \, S_i^{-1},$$

$$\text{and } S_i = \frac{1}{\sum_{k=1}^{n} u_{ik}^m} \cdot \sum_{k=1}^{n} u_{ik}^m (x_k - v_i)(x_k - v_i)^T.$$

U represents fuzzy c-partitions, V represents the vector of centers, m is a weighting exponent, $x_k$ is a measured value pair, and $v_i$ is the center of cluster i. The number of clusters is fixed before the start of the algorithm. For example, when k=2, such as when the clusters represent blood and healthly myocardium, locations with a probability $P_i<0.75$ of belonging to blood, and a probability of $P_j<0.45$ of belonging to healthy myocardium define infarct. Locations with a probability of $P_i<0.75$ of belonging to blood, and a probability $0.45<P_j<0.65$ of belonging to healthy myocardium define grey zone. Alternatively k=3, such as when clusters represent blood, healthy myocardium, and infarct, the grey zone is defined as a probability $P_i<0.75$ of belonging to infarct, and a probability $P_j<0.65$ of belonging to healthy myocardium. The probability limits can be refined with larger patient cohorts or larger sample spaces. Fuzzy c-means (FCM) algorithms allocate membership of points such as measured value pairs to fuzzy clusters.

Figure 3A:
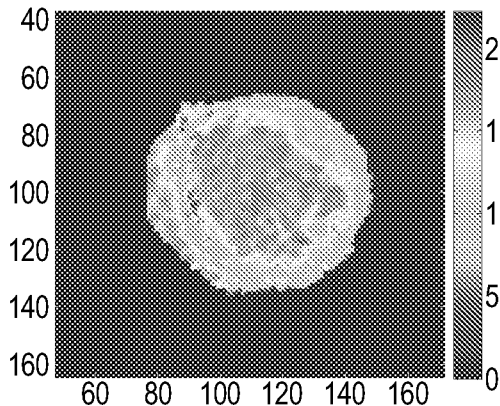

In FIGS. 3A-D, an example of the system with a left ventricular (LV) cardiac analysis of one subject is shown. In FIG. 3A, a T1 map or image without contrast enhancement is shown of a LV area in short axis view. The blood is contrasted with the overlapping healthly myocardium, infarct and grey zone. The blood dominates the image.

Figure 3B:
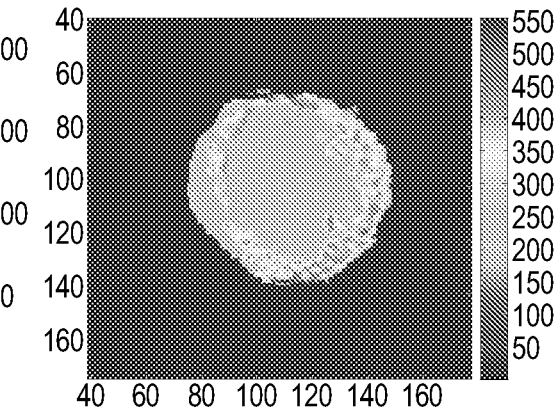

In FIG. 3B, a co-registered T1 map of the LV after administration of the contrast agent is shown. The healthy myocardium is contrasted with the overlapping blood, infarct, and grey zone. The healthy myocardium forms a ring area.

Figure 3C:
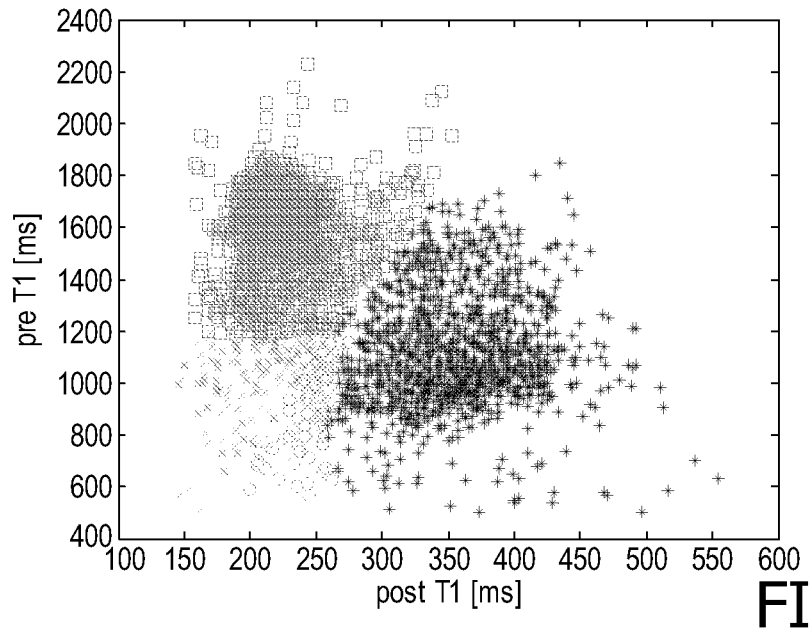

FIG. 3C, illustrates a visualization of clustering with a scatter plot of the grey scale or contrast values of each corresponding voxel in FIGS. 3A and 3B. With the clustering algorithm distances of points from cluster centers are identified and the distances are minimized, such as with a cost function, to generate clusters corresponding to each tissue type. In this instance, a FCM algorithm with the FCGK modification allocates membership of the pairs of T1 values from FIGS. 3A and 3B. In other embodiments, other FCM techniques divide the points of FIG. 3C into clusters.

The points of FIG. 3C which are in the blood cluster are represented by small squares (upper left). The points that are clustered in the healthy myocardium are represented by small plus signs (lower right). The points in the infarct cluster are represented by small "X"s (beneath the blood cluster and to the left of the healthy myocardium). The points in the grey zone cluster are represented by small circles (to the right of the infarct and below the blood). The clusters are graphically depicted in FIG. 2.

Figure 3D:
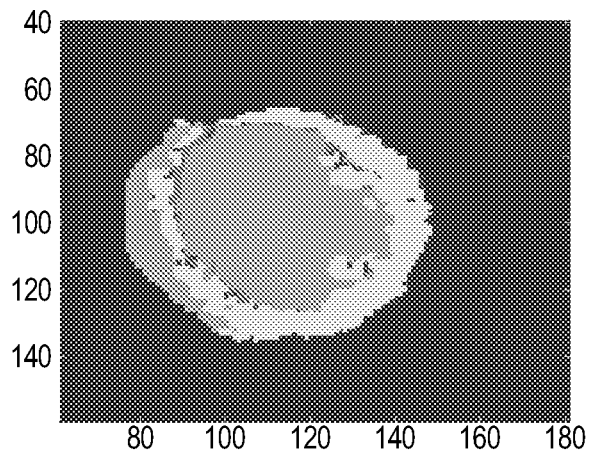

FIG. 3D shows a LV image with the locations contrasted by classified tissue type. The tissue types represented include blood, healthy myocardium, infarct and grey zone. The location of the measured value pairs from corresponding voxel of FIGS. 3A and 3B is used by the segmenter to determine the tissue type of each voxel. Each voxel is given the contrast or color assigned to the determined tissue type to generate the LV image of FIG. 3D. The volume segmented by the segmenter and measured by the analytics unit in this example includes a grey zone of 85 mm² and an infarct of 154 mm². The infarct can be distinguished at the edge from the large ring area of the healthy myocardium. The difficulty of manually measuring the infarct and the grey zone with other methods, can be seen when comparing the image of FIG. 3D with the image of FIG. 3A and/or FIG. 3B.

In FIG. 4, an embodiment of the method of medical imaging is flowcharted. In a step 40, a first image is acquired and stored in the data store. The image can be acquired directly from an imaging device or indirectly by retrieval from storage memory such as disk storage. After administration of a contrast agent, a second image is acquired in a step 42. In other embodiments repeated acquisitions are made at various time intervals to ensure optimal contrast. The images are co-registered and/or corrected for motion by the registrar in a step 44.

The classification module in a step 46 creates or generates measured value pairs. The measured value pairs include measured values from corresponding voxels of the first and second images in which at least one measured value exceeds a threshold or in a range of measured values indicative of a tissue type contrasted. The measured value pairs and associated voxel location can be represented as a matrix of values such as (measured value 1, measured value 2, voxel location).

The classification module in a step 48 allocates membership of the measured value pairs to clusters. Each cluster is classified as a tissue type. The allocation of membership is based on a fuzzy c-means (FCM) algorithm such as FCM with FCGK modification.

The segmenter assigns in a step 50 the classified tissue type of each measured value pair to a volume corresponding to the first and second images. Alternatively, one of the first and second images can be used to display the classified tissue types such as setting the intensity and or color of a voxel to a value indicative of the classified tissue types.

In an step 52, the user interface contructs a visualization of the measured value pairs and cluster membership such as a scatter diagram or contour plot. The visualization can be useful for comparing the clustering between images taken at different time intervals, and/or different clustering algorithms or parameters.

A diagnostic image is constructed in a step 54. The diagnostic image includes a display of the imaged region marked to denote each classified tissue type. In one example, the diagnostic image can include the first or second image which show other anatomical references or spatial relationships colorized to designate the tissue types.

In a step 56, the analytics unit analyzes the diagnostic image such as calculating a volume measurement of segmented tissue types. At risk tissue types are calculated and optionally healthly tissue types. Other analytics applied can include comparisons such as ratios between segmented volumes, comparison with various patient populations, and the like. The analytics can also include other statistics such as length, average density, maximum depth, and the like.

The display device in a step 58, displays a diagnostic image contrasting the different tissue types and/or measuring the volume of tissue types at risk such as infarct and grey zone. Optionally in a step 60, the diagnostic image, analytics, and/or cluster visualization can be stored in a patient data management system.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A medical cardiac imaging system, comprising:
   a data store configured to store a pre-contrast $T_1$ image map generated prior to the injection of a contrast agent and a post-contrast $T_1$ image map generated after injection of a contrast region, each image map being co-registered and with different contrast;
   one or more processors configured to:
   cluster $T_1$ values of pairs of corresponding voxel pairs of the pre-contrast and post-contrast image maps in a scatter plot which plots $T_1$ values of the pre-contrast image map with $T_1$ of the post-contrast image map to identify clusters corresponding to each of a plurality of tissue types, the tissue types including healthy myocardium, blood, infarct, and grey zone, the grey zone including pre-infarct and heterogeneous infarct;
   assign one of the tissue types to each voxel pair,
   calculate a volume of the infarct and a volume of the grey zone; and
   a display device configured to display a diagnostic image with each classified tissue type depicted in a different contrast or color, the volume of the infarct, and the volume of the grey zone.

2. The cardiac medical imaging system, according to claim 1, wherein the one or more processors are further configured to:
   cluster the voxel pairs based on a fuzzy c-means algorithm, each cluster corresponding to one of the tissue types.

3. The cardiac medical imaging system according to claim 1, wherein the first and second $T_1$ image maps are created on the same imaging device.

4. A method of medical imaging, comprising:
   acquiring a first $T_1$ image with a magnetic resonance imaging system;
   acquiring a second $T_1$ image with the magnetic resonance imaging system wherein the second $T_1$ image has a contrast different from the contrast of the first image, wherein the first $T_1$ image and the second $T_1$ image are acquired using the same inversion recovery gradient echo sequence, wherein the first $T_1$ image contrasts a first healthy tissue type with a second healthy tissue type which includes at risk tissue types and the second $T_1$ image contrast a first healthy tissue type which includes at risk tissue types with a second healthy tissue type, wherein the first healthy tissue type is myocardium, wherein the second healthy tissue type is blood, wherein the at risk tissue types are grey zone and infarct;
   co-registering the first and second $T_1$ images;

creating measured contrast value pairs of corresponding voxels from the first and second $T_1$ images, the measured value pairs each including, one value from the first image and one value from the second image for a corresponding voxel;

allocating membership of measured value pairs to clusters, each cluster corresponding to one of a plurality of tissue types;

assigning one of the plurality of tissue types to each voxel of a diagnostic image of a corresponding imaged region with the first and second images;

displaying the diagnostic image in which each classified tissue type depicted in a different contrast or color.

5. The method of medical imaging according to claim 4, wherein the first image is a pre-contrast agent image, and wherein the second image is a post-contrast agent image.

6. The method of medical imaging according of claim 4, wherein the first and second $T_1$ images are generated on the same imaging device and are inherently co-registered.

7. The method of medical imaging according to claim 4, wherein the sequence is an inversion recovery gradient echo sequence.

8. The method of medical imaging according to claim 7, wherein the method further comprises injecting the subject with a contrast agent between acquiring the first image and acquiring the second image.

9. The method of medical imaging according to claim 4, wherein the measured values include $T_1$s of the corresponding voxels of first $T_1$ image and the second $T_1$ image further including:

displaying the clustered measured value pairs in a scatter diagram plotting $T_1$ of the first $T_1$ image versus $T_1$ of the second $T_1$ image.

10. The method of medical imaging according to claim 4, further including:

calculating the volume of a selected tissue type in the diagnostic image; and wherein the displaying further includes:

displaying the calculated volume of the selected tissue type.

11. A non-transitory computer-readable medium carrying software configured to control one or more processors to perform claim 1 the method of claim 4.

12. A system comprising: one or more processors programmed to perform the method according to claim 4.

13. A magnetic resonance imaging system, comprising:

at least one processor which is programmed to:

receive a first $T_1$ weighted image and a second $T_1$ weighted image, wherein the first $T_1$ weighted image and the second $T_1$ weighted image were acquired using an inversion recovery gradient echo magnetic resonance sequence, wherein the first $T_1$ weighted image contrasts myocardium and grey zone and infarct tissues and the second $T_1$ weighted image contrasts the myocardium and blood;

identify pairs of corresponding voxels of the first and second $T_1$ weighted images;

identify clusters of corresponding pairs in a scatter plot plotting $T_1$ of the first $T_1$ image versus $T_1$ of the second $T_1$ image;

assign one of the myocardium, blood, grey zone, and infarct to each voxel of a diagnostic image corresponding to the first and second $T_1$ weighted images; and a display device configured to display the diagnostic image with each of the myocardium, blood, grey zone, and infarct depicted in a different contrast or color.

14. The magnetic resonance imaging system according to claim 13, wherein the first $T_1$ weighted image is a pre-contrast image and the second $T_2$ weighted image is a post-contrast image generated after the subject has been injected with a contrast agent.

* * * * *